C. H. HOWARD & H. M. PFLAGER.
CAR TRUCK FRAME.
APPLICATION FILED JUNE 19, 1912.
1,052,483.
Patented Feb. 11, 1913.
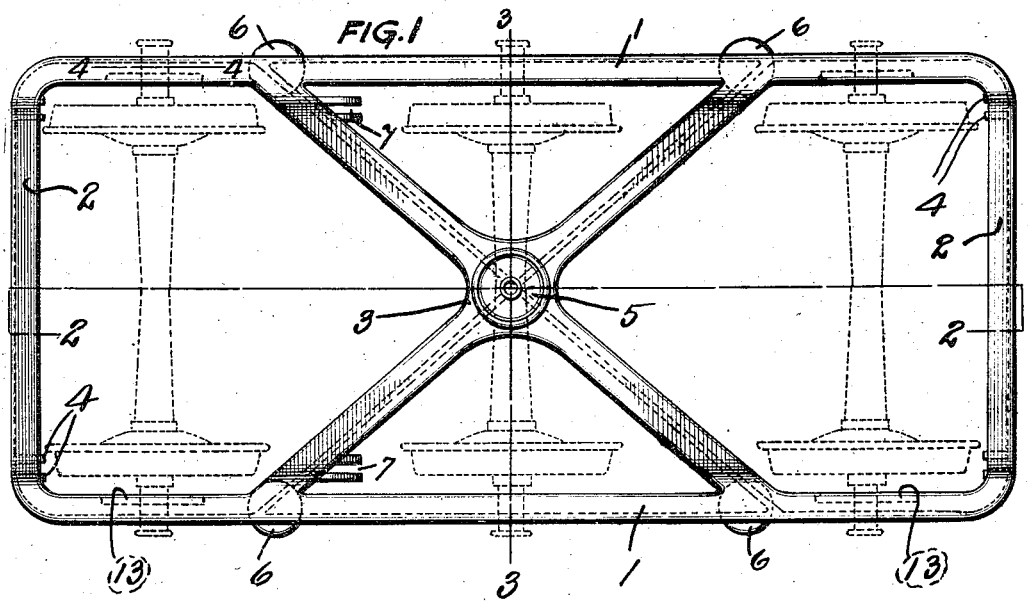
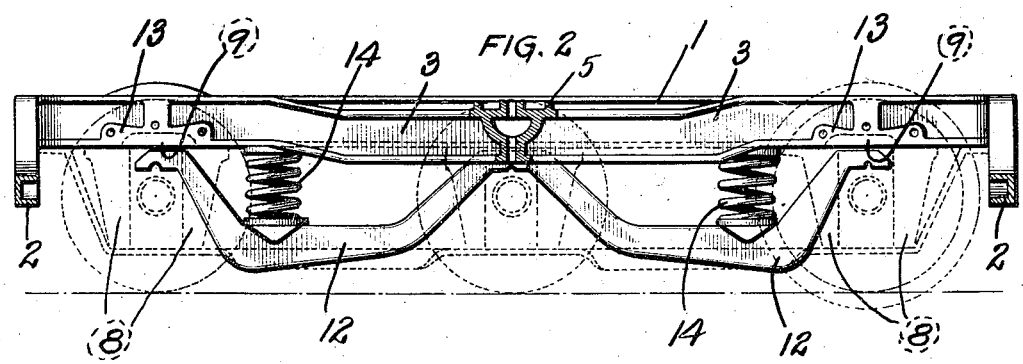
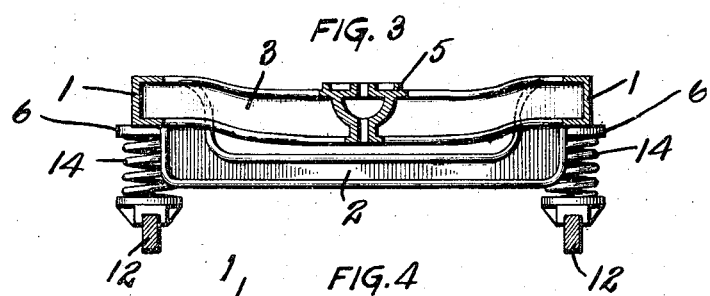
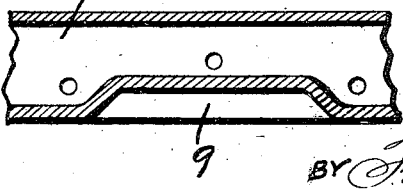
WITNESSES
INVENTORS
CLARENCE H. HOWARD
HARRY M. PFLAGER
BY ATT'Y.

UNITED STATES PATENT OFFICE.

CLARENCE H. HOWARD AND HARRY M. PFLAGER, OF ST. LOUIS, MISSOURI, ASSIGNORS TO COMMONWEALTH STEEL COMPANY, OF ST. LOUIS, MISSOURI, A CORPORATION OF NEW JERSEY.

CAR-TRUCK FRAME.

1,052,483.  Specification of Letters Patent.  Patented Feb. 11, 1913.

Application filed June 19, 1912. Serial No. 704,691.

*To all whom it may concern:*

Be it known that we, CLARENCE H. HOWARD and HARRY M. PFLAGER, citizens of the United States, residing at St. Louis, Missouri, have invented a certain new and useful Improvement in Car-Truck Frames, of which the following is a full, clear, and exact description, such as will enable others skilled in the art to which it appertains to make and use the same, reference being had to the accompanying drawings, forming part of this specification, in which—

Figure 1 is a plan view of a car truck frame of our improved construction. Fig. 2 is a vertical section taken on the line 2—2 of Fig. 1. Fig. 3 is a cross section taken on the line 3—3 of Fig. 1. Fig. 4 is an enlarged detail section taken on the line 4—4 of Fig. 1.

Our invention relates to a railway car truck frame of the six-wheel type, the principal object of our invention being to provide a comparatively simple truck frame comprising wheel pieces, end rails and an X-shaped center member or bolster, which latter carries the center bearing, all of which parts are cast integral, thereby forming a one-piece structure having great strength and rigidity combined with lightness of weight.

Heretofore in the construction of truck frames of the type to which our invention pertains it has been the general practice to provide frames having the wheel pieces and transoms formed in one casting, and the center bolster in a separate casting, the latter carried by swing hangers from the transoms, but in our improved construction the transversely disposed transom members are dispensed with and the bolster member which is formed integral with the wheel pieces is made up of pairs of diverging arms or legs, and therefore performs the functions of both transoms and a center bolster, thereby greatly simplifying and cheapening the cost of manufacture of truck frames and providing a six-wheel truck frame having a much shorter wheel base than the types of six-wheel trucks now in general use.

By constructing a truck without transoms, and by forming the center bolster integral with the wheel pieces of the truck frame, the swing hangers ordinarily used for supporting the truck bolster are eliminated, thereby permitting the wheel base of the truck to be materially reduced, and this arrangement enables the truck to traverse curves with less resistance than a truck of comparatively long wheel base, and likewise, the truck having the comparatively short wheel base can traverse shorter curves than a longer truck.

The truck frame herein shown and described is of the same general type and is an improvement upon the truck frames shown in United States Patents Nos. 774,492 and 903,191.

As shown in the accompanying drawings, our improved truck frame comprises side rails or wheel pieces 1, end rails 2 and an X-shaped bolster member 3, all of which parts are formed integral, preferably by casting. The wheel pieces 1 are preferably channel-shaped in cross section with the horizontal flanges projecting inwardly and the end pieces 2, the central portions of which occupy a plane slightly below the plane occupied by the wheel pieces, are likewise channel-shaped in cross section. Formed integral with the end pieces 1 at points near their ends are pairs of depending ears or lugs 4 to which the upper ends of the brake hangers are pivotally connected. The central portion of the X-shaped center bolster is provided with a center bearing plate 5, and the ends of the arms or legs of the bolster unite with the wheel pieces 1 at points adjacent to the equalizer spring caps 6, which latter are formed integral with the undersides of said wheel pieces.

The arms or legs of the center bolster 3 are preferably of I-beam shape in cross section, but it will be readily understood that these parts, as well as the wheel pieces and end rails, may be of any desired shape in cross section, as, for instance, I, T, L, Z or of inverted U-shape.

Formed integral with a pair of the arms or legs of the center bolster are pairs of depending ears or lugs 7 to which the upper ends of the brake hangers for the center truck wheels are pivotally connected.

The pedestals 8 (which form no part of our invention) are fixed to the wheel pieces in any suitable manner, and formed in the undersides of said wheel pieces at the points where said pedestals are attached are recesses 9 in order to accommodate the ends of the equalizing bars 12, which latter are arranged between the journal boxes that are arranged beween the pedestal jaws. In order to reinforce and strengthen the wheel pieces at the points where the same are recessed, as just described, vertically disposed, longitudinally extending walls or webs 13 are formed integral with the inner edges of the flanges of said wheel pieces, and said webs or walls extend slightly beyond the ends of the recesses.

The usual heavy coil springs 14 are interposed between the equalizing bars and the wheel pieces 1, the upper ends of which springs bear against the spring caps 6.

A truck frame of our improved construction is comparatively simple, can be easily and cheaply produced for the reason that its essential parts are formed in a single piece, and by forming the center bolster X-shape and spreading the ends of the arms or legs thereof, the usual transom members are dispensed with, thereby producing a comparatively short truck frame, which construction is particularly desirable in six-wheel trucks for the reason that a truck having a comparatively short wheel base will traverse curves with much less resistance and will take much shorter curves than trucks of comparatively long wheel base.

It will be readily understood that minor changes in the size, form and construction of the various parts of our improved truck frame can be made and substituted for those herein shown and described without departing from the spirit of our invention, the scope of which is set forth in the appended claims.

We claim:

1. A truck frame of the class described, comprising wheel pieces, an X-shaped bolster member and spring seats on the wheel pieces adjacent to the points where the ends of the bolster member unite with the wheel pieces, all of which parts are cast integral.

2. The hereindescribed truck frame comprising wheel pieces, end rails, brake hanger lugs on said end rails, and an X-shaped bolster member, all of which parts are cast integral.

3. In a truck frame of the class described, a pair of wheel pieces, a pair of end rails, brake hanger lugs depending from said end rails, an X-shaped bolster member, and pairs of brake hanger lugs on said bolster member, all of which parts are cast integral.

4. In a truck frame of the class described, a pair of wheel pieces, and a pair of crossed rails united to form a bolster member, the ends of which rails are integral with said wheel pieces.

5. In a truck frame of the class described, a pair of wheel pieces, a pair of crossed rails which combine to form a bolster member the ends of which rails are integral with said wheel pieces, and a center bearing plate on said rails at the points where the same intersect.

6. As a new article of manufacture, a truck frame cast in a single piece and comprising a pair of wheel pieces, and an X-shaped bolster member, the ends of which are joined to the wheel pieces at points between the transverse planes occupied by the axles of the truck.

7. In a truck frame the combination with a rectangular frame, of an X-shaped bolster member, the ends of the arms of which are integral with the side rails of the frame and spring seats integral with the side rails of the frame adjacent to the ends of the arms of said bolster member.

8. In a truck frame the combination with a rectangular frame, of an X-shaped bolster member, the ends of the arms of which are integral with the side rails of the frame, a center bearing plate on the X-shaped bolster member and spring seats integral with the side rails of the frame adjacent to the ends of the arms of the bolster member.

9. In a truck frame the combination with a rectangular frame, of an X-shaped bolster member, the ends of the arms of which are integral with the side rails of the frame, and pairs of brake hanger lugs on said bolster member.

10. In a truck frame, a rectangular frame, an X-shaped bolster member integral with said frame, brake hanger lugs integral with said bolster member, brake hanger lugs integral with the frame, and a center bearing plate integral with said bolster member.

11. In a truck frame, a rectangular frame, an X-shaped bolster member integral with said frame, and pairs of brake hanger lugs integral with said bolster member.

12. In a truck frame, a rectangular frame, an X-shaped bolster member integral therewith, a center bearing plate integral with the bolster member, and pairs of brake hanger lugs integral with said bolster member.

13. In a truck frame, a rectangular frame, an X-shaped bolster member integral therewith, a center bearing plate on said bolster member, pairs of brake hanger lugs on said bolster member, and pairs of brake hanger lugs on the end rails of the rectangular frame.

14. As a new article of manufacture, an integral one-piece truck frame comprising a pair of wheel pieces, and an X-shaped bolster member, the ends of the arms of which are united with said wheel pieces.

15. As a new article of manufacture, an integral one-piece truck frame comprising wheel pieces, end rails and an X-shaped bolster member, the ends of the arms of which are united with said wheel pieces.

In testimony whereof we hereunto affix our signatures in the presence of two witnesses, this 28th day of May, 1912.

CLARENCE H. HOWARD.
HARRY M. PFLAGER.

Witnesses:
HAL C. BELLVILLE,
FRED H. BLANKENHORN.